(12) United States Patent
Heaton et al.

(10) Patent No.: US 6,958,819 B1
(45) Date of Patent: *Oct. 25, 2005

(54) ENCODER WITH AN ALIGNMENT TARGET

(75) Inventors: John D. Heaton, Fremont, CA (US);
Weidong Yang, Milpitas, CA (US);
Roger R. Lowe-Webb, Sunnyvale, CA (US)

(73) Assignee: Nanometrics Incorporated, Milpitas, CA (US)

( * ) Notice: Subject to any disclaimer, the term of this patent is extended or adjusted under 35 U.S.C. 154(b) by 488 days.

This patent is subject to a terminal disclaimer.

(21) Appl. No.: 10/116,855

(22) Filed: Apr. 4, 2002

(51) Int. Cl.$^7$ ............................................. G01B 11/14
(52) U.S. Cl. ..................................... 356/616; 356/401
(58) Field of Search ............................... 356/614–622, 356/399–401, 509; 250/548

(56) References Cited

U.S. PATENT DOCUMENTS

| | | | | |
|---|---|---|---|---|
| 5,214,492 A | | 5/1993 | LoBianco et al. | 356/400 |
| 5,216,257 A | | 6/1993 | Brueck et al. | 250/548 |
| 5,307,152 A | | 4/1994 | Boehnlein et al. | 356/376 |
| 5,559,601 A | | 9/1996 | Gallatin et al. | 356/363 |
| 5,596,413 A | * | 1/1997 | Stanton et al. | 356/401 |
| 5,805,290 A | | 9/1998 | Ausschnitt et al. | 356/401 |
| 5,808,742 A | * | 9/1998 | Everett et al. | 356/509 |
| 5,969,819 A | | 10/1999 | Wang | 356/371 |
| 6,077,756 A | | 6/2000 | Lin et al. | 438/401 |
| 6,079,256 A | * | 6/2000 | Bareket | 73/105 |
| 6,084,712 A | | 7/2000 | Harding | 359/618 |
| 6,130,750 A | | 10/2000 | Ausschnitt et al. | 356/401 |
| 6,313,460 B1 | | 11/2001 | Haas et al. | 250/231.13 |
| 6,350,984 B1 | | 2/2002 | Senda | 250/231.13 |
| 6,407,396 B1 | | 6/2002 | Mih et al. | 250/491.1 |
| 6,429,930 B1 | | 8/2002 | Littau et al. | 356/124 |
| 6,458,605 B1 | | 10/2002 | Stirton | 438/7 |
| 6,699,624 B2 | * | 3/2004 | Niu et al. | 430/5 |
| 6,710,876 B1 | * | 3/2004 | Nikoonahad et al. | 356/401 |
| 2002/0135875 A1 | | 9/2002 | Niu et al. | 359/564 |
| 2002/0158193 A1 | | 10/2002 | Sezginer et al. | 250/237 |
| 2003/0002043 A1 | | 1/2003 | Abdulhalim et al. | 356/400 |

(Continued)

FOREIGN PATENT DOCUMENTS

WO    WO 01/84382 A1    11/2001    ........... G06F 17/50

(Continued)

OTHER PUBLICATIONS

D.C. Flanders & Henry I. Smith, A new interferometric alignment technique[a], Applied Physics Letters, vol. 31, No. 7, Oct. 1, 1977, pp. 426-428.

(Continued)

*Primary Examiner*—Hoa Q. Pham
(74) *Attorney, Agent, or Firm*—Silicon Valley Patent Group LLP

(57) ABSTRACT

An encoder uses an alignment target that includes periodic patterns on the movable element and the stationary element. The alignment target may include at least two measurement locations, each location having a different offset between the periodic pattern on the movable element with respect to the periodic pattern on the stationary element. Alternatively, two measurements using different polarization states may be made at one location. When the periodic patterns on the movable element and the stationary element are aligned, the difference between the two measurements will produce a minimum, i.e., approximately a zero value plus noise. By counting the minima, the precise position of the movable element with respect to the stationary element can be determined. The resolution of the encoder may be further increased using reference measurements.

45 Claims, 9 Drawing Sheets

U.S. PATENT DOCUMENTS

| | | | |
|---|---|---|---|
| 2003/0042579 A1 | 3/2003 | Schulz | 257/629 |
| 2003/0043372 A1 | 3/2003 | Schulz | 356/327 |
| 2003/0043375 A1 | 3/2003 | Opsal | 356/369 |
| 2003/0044702 A1 | 3/2003 | Schulz | 430/30 |
| 2003/0160163 A1 | 8/2003 | Wong et al. | 250/237 |
| 2003/0169423 A1 | 9/2003 | Finarov et al. | 250/237 |
| 2003/0212525 A1 * | 11/2003 | Bischoff et al. | 702/127 |
| 2003/0223630 A1 | 12/2003 | Adel et al. | 382/145 |
| 2004/0101983 A1 | 5/2004 | Jones et al. | 438/14 |

FOREIGN PATENT DOCUMENTS

| | | | | |
|---|---|---|---|---|
| WO | WO 02/25723 A2 | 3/2002 | | H01L 21/66 |
| WO | WO 02/065545 A2 | 8/2002 | | H01L 21/66 |
| WO | WO 02/069390 A2 | 9/2002 | | H01L 21/66 |
| WO | WO 02/084213 A1 | 10/2002 | | G01B 11/00 |
| WO | WO 03/071471 A1 | 8/2003 | | G06K 9/00 |
| WO | WO 2004/008068 A1 | 1/2004 | | G01B 11/27 |

OTHER PUBLICATIONS

Bischoff, J. et al., "Light Diffraction Based Overlay Measurement" *Proceedings of SPIE*, vol. 4344 (2001) pp. 222-233.

Michaelis, A. et al., "Spectroscopic Anistropy Micro-Ellipsometry (SAME) for determiation of lateral and vertical dimensions of sub-micron lithographic structures" IEEE Catalog Number 99TH8453 (1999) pp. 131-134.

NanoWave:Technology/development tools, http://www.nanowave.com/technology_applications/tech_devtoolsPR.html, 2 pages, downloaded Apr. 9, 2002.

NanoWave:Technology/how it works, http://www.nanowave.com/technology_applications/tech_HIWPR.html, 3 pages, downloaded Apr. 9, 2002.

NanoWave:Technology/product design, http://www.nanowave.com/technology_applications/tech_designPR.html, 4 pages, downloaded Apr. 9, 2002.

* cited by examiner

ENCODER WITH AN ALIGNMENT TARGET

BACKGROUND OF THE INVENTION

1. Field of the Invention

The present invention relates to a position measurement device, and in particular to an encoder that includes an alignment target having a designed in offset between periodic patterns.

2. Discussion of the Related Art

Position measurement devices, such as optical encoders, are well known in the art.

FIG. 1 shows a conventional optical encoder 10 that includes a light source 12, which produces a light beam 13. The light beam 13 passes through a grid plate 14 that includes a number of regular opaque and transparent regions 16. After passing through the grid plate 14, the light beam 13 is received by a detector 18. As the grid plate 14 moves relative to the light source 12 and detector 18, as indicated by the arrows in FIG. 1, the light beam 13 will pass through only the transparent regions 16 on grid plate, creating pulses of light at the detector 18. The detector 18 converts the pulses of light into a periodic electronic signal. By counting the pulses from the detector 18, and knowing the length of each transparent and opaque region, the position of the grid plate 14 relative to the light source 12 and detector 18 can be determined.

Encoder 10 is a relatively inexpensive device, but unfortunately, the accuracy of the device is limited. Techniques such as interpolation may be used to improve the accuracy, but even with interpolation the accuracy is limited to approximately 20 nm. Another type of encoder that is used to provide an accurate position measurement is a differential interferometer.

FIG. 2 shows a conventional differential interferometer alignment system 50 that may be used as an encoder. Alignment system 50 includes a light source 52 that produces monochromatic light. Typically, the monochromatic light is collimated. A beam splitter 54 splits the light to be reflected off a stationary mirror 56 and a mirror 58, which is movable, as indicated by the arrows in FIG. 2. Mirror 58 is typically mounted on a movable object, e.g., a stage. The light is reflected off mirrors 56 and 58 and is recombined at beam splitter 54. The combined light is focused by a lens 60 onto a detector 62. The operation of a differential interferometer is well known. Advantageously, alignment system 50 provides an accuracy of approximately 10 nm, but typically has increased cost relative to a simpler encoder, such as that shown in FIG. 1.

Thus, there is a need for an inexpensive but highly accurate encoder.

SUMMARY

An encoder, in accordance with the present invention, uses an alignment target that includes periodic patterns on the movable element and the stationary element. The alignment target may include at least two measurement locations, each location having a different offset between the periodic patterns on the movable element with respect to the periodic pattern on the stationary element. Alternatively, two measurements using different polarization states may be made at one location. When the periodic patterns on the movable element and the stationary element are aligned, the difference between the two measurements will produce a minima, i.e., approximately a zero value plus noise. By counting the minima, the precise position of the movable element with respect to the stationary element can be determined. The resolution of the encoder may be further increased using reference measurements.

In accordance with one embodiment, a method of determining the position of a first element with respect to a second element includes providing an alignment target on the first element and the second element, the alignment target having at least one periodic pattern on the first element and at least one periodic pattern on the second element, the alignment target when aligned has a first location with the periodic pattern on the first element offset from the periodic pattern on the second element by a first amount and having a second location with the periodic pattern on the first element offset from the periodic pattern on the second element by a second amount. The first element and second element are moved with respect to each other. The first and second locations are illuminated with incident radiation and after the radiation interacts with the alignment target, the radiation is detected. The detected radiation from each location is then compared to determine when the alignment target is aligned. The method includes counting the times the alignment target is in alignment to determine the position of the first element with respect to the second element.

In another embodiment, the method includes providing an alignment target on the first element and the second element, the alignment target having at least one periodic pattern on the first element and at least one periodic pattern on the second element, the alignment target has a first location with the periodic pattern on the first element offset from the periodic pattern on the second element by a first amount and having a second location with the periodic pattern on the first element offset from the periodic pattern on the second element by a second amount. The first element and second element are moved with respect to each other. The first and second locations are illuminated with incident radiation and after the radiation interacts with the alignment target, the radiation is detected. The detected radiation from each location is then compared. The method includes detecting when the comparison of the detected radiation is at an approximate minimum and counting the minima to determine the position of the first element with respect to the second element.

In another embodiment, the method includes providing an alignment target on the first element and the second element, the alignment target has a first periodic pattern on the first element and a second periodic pattern on the second element. The first element and second element are moved with respect to each other. The alignment target is illuminated with light that has at least two polarization states and the intensities of the polarization states of the light after interacting with the alignment target is detected. The detected intensities are then compared. The method includes detecting when the comparison of the intensities is at an approximate minimum and counting the minima to determine the position of the first element with respect to the second element.

An apparatus in accordance with the present invention includes an alignment target on the first element and the second element, the alignment target having at least one periodic pattern on the first element and at least one periodic pattern on the second element, the alignment target has a first location with the periodic pattern on the first element offset from the periodic pattern on the second element by a first amount and having a second location with the periodic pattern on the first element offset from the periodic pattern on the second element by a second amount. The apparatus also includes at least one light source for producing light to be incident on the first location and the second location of the alignment target. A first light detector and a second light detector for detecting light that interacts with the locations. A comparator to calculate the difference between the detected light from the first and second locations, wherein the comparator produces an output signal that has a minimum when the periodic pattern on the first element and the periodic pattern on the second element are aligned. The apparatus also includes a counter for counting the number of minima produced by the comparator to determine the position of the first element with respect to the second element. The apparatus may use a processor with computer code used to calculate the difference between the detected light from the first and second locations, and to count the number of minima.

In another embodiment, the apparatus includes an alignment target on the first element and the second element, the alignment target has a first periodic pattern on the first element and a second periodic pattern on the second element and at least one light source for producing light with a plurality of polarization states to be incident on the alignment target. The apparatus includes a light detector for detecting the intensities of the polarization states after the light interacts with alignment target, and a comparator to calculate the difference between the intensities of said polarization states. A counter counts the number of minima produced by the comparator to determine the position of the first element with respect to the second element.

DETAILED DESCRIPTION

In accordance with an embodiment of the present invention, an encoder uses an alignment target that includes periodic patterns on the movable element and the stationary element. The alignment target may include at least two measurement locations, each location having a different offset between the periodic pattern on the movable element with respect to the periodic pattern on the stationary element. Alternatively, two measurements using different polarization states may be made at one location. When the periodic patterns on the movable element and the stationary element are aligned, the difference between the two measurements will produce a minima, i.e., approximately a zero value plus noise. By counting the minima, the precise position of the movable element with respect to the stationary element can be determined.

The present invention may be used to determine the position of one element with respect to another with a fraction of a nanometer accuracy. Thus, the present invention provides a large improvement compared to current technology.

The alignment target used in accordance with the present invention is similar to that described in detail in U.S. patent application entitled "Alignment Target with Designed in Offset" by Weidong Yang, Roger R. Lowe-Webb, John D. Heaton, and Guoguang Li, Ser. No. 10/116,863; U.S. patent application Entitled "Positioning Two Elements Using An Alignment Target with a Designed in Offset" by Weidong Yang, Roger R. Lowe-Webb, Ser. No. 10/116,964; and in U.S. patent application entitled "Measuring An Alignment Target With Multiple Polarization States" by Weidong Yang, Roger R. Lowe-Webb, Ser. No. 10/116,798, all of which are filed herewith and have the same assignee as the present application and all of which are incorporated herein by reference.

Figure 1:
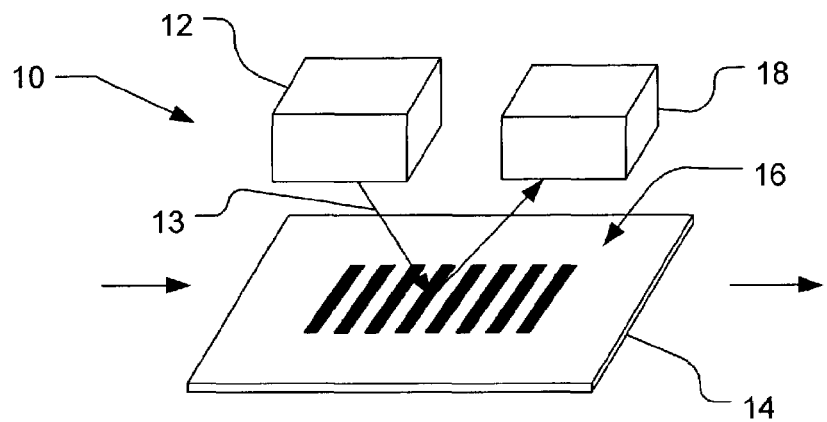
FIG. 1 shows a conventional encoder.
Figure 2:
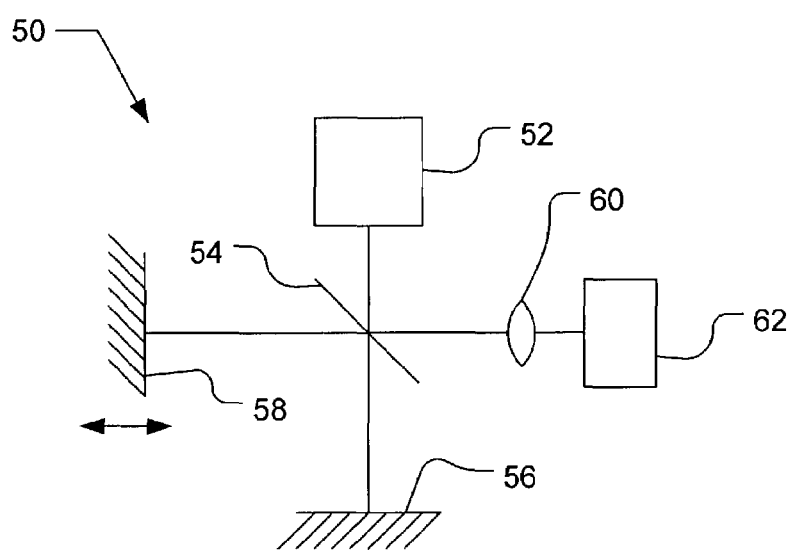
FIG. 2 shows a conventional differential interferometer encoder.
Figure 3:
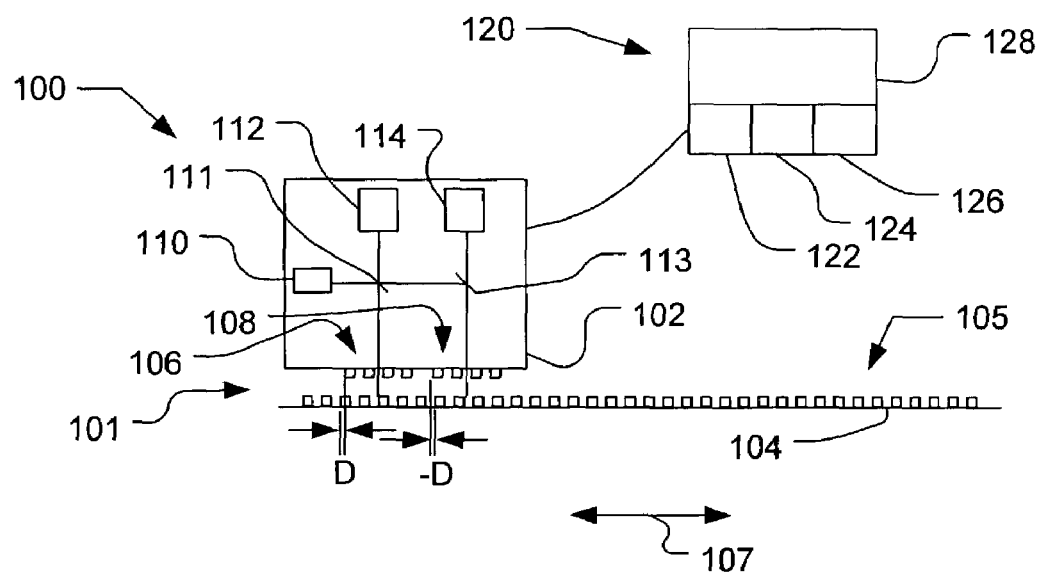
FIG. 3 shows an embodiment of an encoder in accordance with the present invention.

FIG. 3 shows one embodiment of an encoder 100 in accordance with the present invention. Encoder 100 includes a sensor head 102 and a scale 104. The scale 104 includes a continuous periodic pattern 105, such as a diffraction grating. In operation, the sensor head 102 and the scale 104 are movable with respect to each other, as indicated by arrow 107. One of the elements, e.g., the sensor head 102, moves, while the other element, e.g., the scale 104, is held stationary. Encoder 100 may be used as a linear encoder or as a rotary encoder.

As shown in FIG. 3, the sensor head 102 has two measurement locations, each of which includes a periodic pattern 106 and 108. Sensor head 102 also includes a light source 110, which may be, e.g., a white LED source. If desired, an external light source may be used, in which case the light source may be coupled to the sensor head 102, e.g., by a fiber optic cable. Moreover, if desired, more than one light source may be used, e.g., one light source for each measurement location.

Sensor head 102 can operate in reflection mode or transmission mode. FIG. 3 illustrates sensor head 102 operating in reflection mode. As shown, beams splitters 111 and 113 direct the light from light source 102 towards the periodic patterns 106 and 108, respectively. The light passes through periodic patterns 106 and 108, and is reflected back by the periodic pattern 105 on the scale 104. The reflected light passes through beam splitters 111 and 113 and is received by detectors 112 and 114, respectively. Thus, the two measurement locations include both the periodic patterns 106 and 108 on the sensor head 102 and the periodic pattern 105 on the scale 104. Thus, it should be understood that periodic patterns 106 and 105 together will be sometimes referred to as measurement location 106, and likewise, periodic patterns 108 and 105 will be sometimes referred to as measurement location 108.

If desired, multiple light sources may be used in sensor head 102. Moreover, if desired, sensor head 102 may operate in transmission mode. In transmission mode, the light is transmitted through periodic pattern 105 on scale 104, as opposed to being reflected, and is received by detectors on the other side of scale 104.

The detectors 112 and 114 detect the resulting light and convert the light into electrical signals that are received by an evaluation circuit 120 coupled to the sensor head 102.

Figure 4:
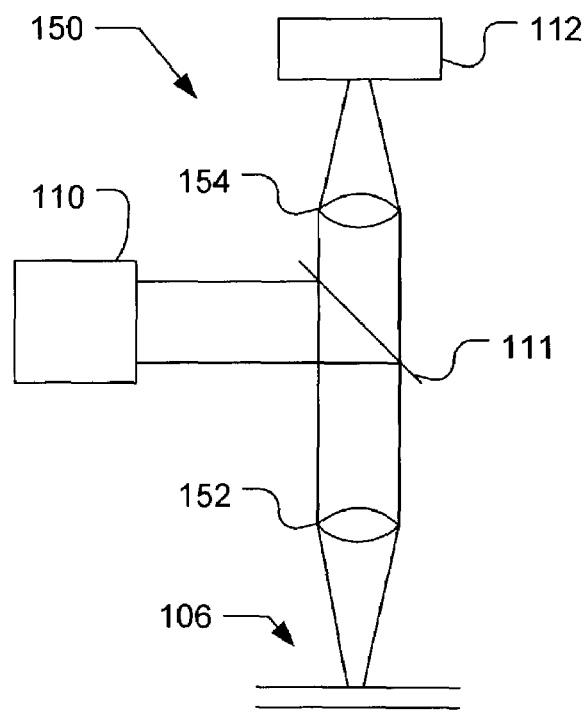
FIG. 4 illustrates a reflectometer that may be used in the encoder in the present invention.

Sensor head 102 may use a reflectometer type device to measure the measurement locations 106 and 108. FIG. 4 illustrates a reflectometer 150 that may be used in the present invention. Reflectometer 150 includes an illumination source 110 that produces radiation that is reflected off beam splitter 111 (or 113). The radiation is focused on the measurement location 106 by lens 152 and interacts with, e.g., is diffracted by, the measurement location 106. After reacting with the measurement location 106, the radiation passes through lens 152 and beam splitter 111 and is focused by another lens 154 onto the detector 112. The operation of reflectometers and similar devices is well known in the art.

Figure 5:
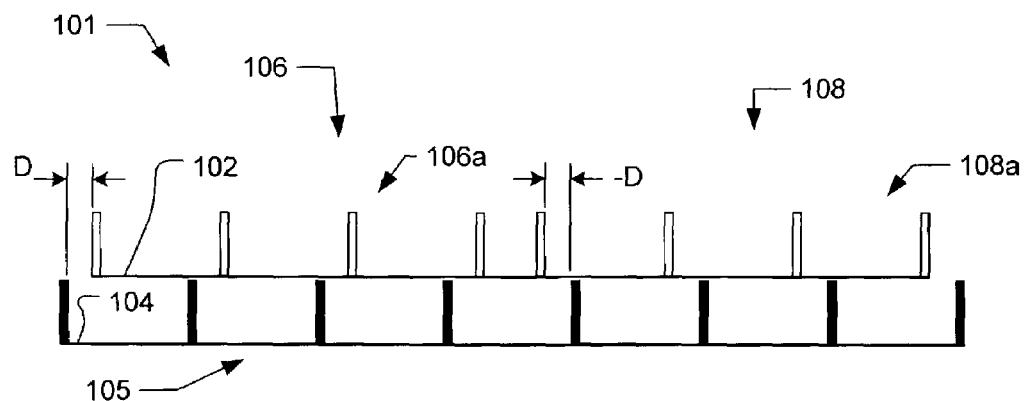
FIGS. 5 and 6 shows a cross-sectional view of the alignment target used with the encoder.

Encoder 100 uses an alignment target, referred to generally in FIG. 3 as alignment target 101, which includes the periodic patterns 106 and 108 on the sensor head and the periodic pattern 105 on the scale. FIG. 5 shows a cross-sectional view of the alignment target 101. The periodic patterns 106 and 108 on the sensor head 102 have different alignment relations with the periodic pattern 105 on the scale 104. The periodic patterns 106 and 108 are defines as being aligned with periodic pattern 105 on scale 104 when there is an offset of +D between the periodic patterns 106 and 105 and an offset of -D between periodic patterns 108 and 105. In other words, the periodic patterns 106 and 108 on sensor head 102 are symmetrically aligned with periodic pattern 105 on scale 104. Because of symmetry, the diffraction patterns produced by periodic patterns 106 and 105 will be the same as the diffraction patterns produced by periodic patterns 108 and 105.

By way of example, the periodic patterns may have a pitch of 400 nm, line widths of 100 nm, and line heights of 200 nm. Of course, the dimensions of the periodic patterns may be altered as desired.

Figure 6:
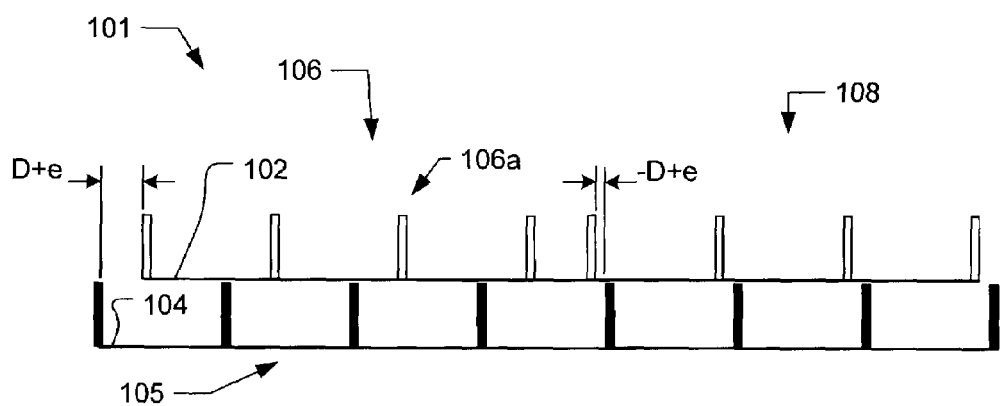

When there is relative movement between the sensor head 102 and the scale 104, however, the offset between the periodic patterns will shift in an asymmetrical manner. As shown in FIG. 6, when sensor head 102 and scale 104 are shifted by an amount e relative to each other, the offset between periodic patterns 106 and 105 will be D+e, while the offset between the periodic patterns 108 and 105 will be -D+e.

Alignment target 101 uses the asymmetrical change in offset to determine when periodic patterns 106 and 108 are in alignment with the periodic pattern 105. By determining the difference between the diffraction patterns generated by measurement location 106 and measurement location 108, it is possible to tell when the periodic patterns 106 and 108 on sensor head 102 are in alignment, as defined above, with the periodic pattern 105 on the scale.

Figure 7:
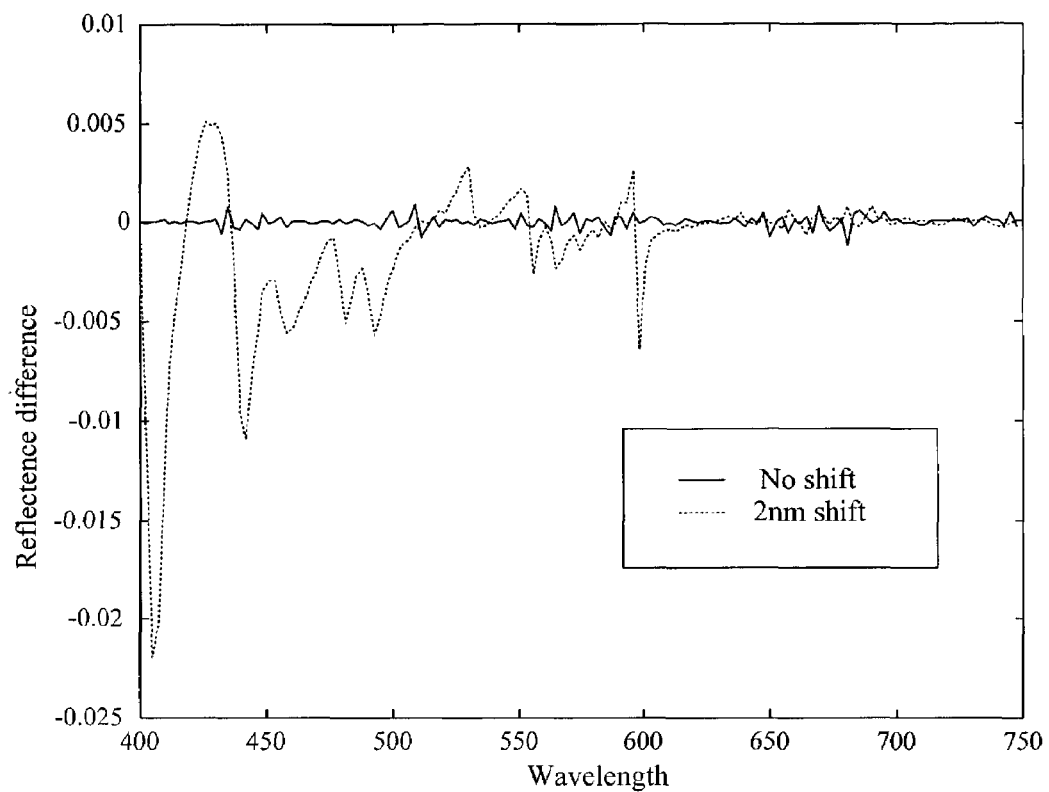
FIG. 7 is a graph showing the difference in the reflectances when there is no shift and when there is a shift of 2 nm.

FIG. 7 is an example of the difference in the reflectances from measurement locations 106 and 108 when there is no shift (shown as the solid line) and when there is a shift of 2 nm (shown as the dotted line). As can be seen in FIG. 7, the difference in spectral reflectance between the measurement locations 106 and 108 when there is no shift is equal to approximately zero (except for a slight amount of noise that can be seen). However, there is a large difference in spectral reflectance between the measurement locations 106 and 108 when there is small shift of 2 nm, particularly within wavelengths 400 to 600 nm. Thus, by calculating the difference between the diffraction at the two measurement locations 106 and 108, small shifts from the defined alignment relationship may be observed.

Referring back to FIGS. 5 and 6, as the shift e from alignment increases, the difference in the spectral reflectance will continue to increase, until the shift e is equal to half the pitch. Because of symmetry, any increase in the shift e beyond half the pitch may be viewed as decreasing the shift e back towards the defined alignment position. Consequently, once the shift e is greater than half the pitch, the difference in the spectral reflectance from measurement locations 106 and 108 will begin to decrease, until the periodic patterns 106 and 108 are in their defined aligned relationship with periodic pattern 105. Once periodic patterns 106 and 108 are in their defined aligned relationship with periodic pattern 105, i.e., no shift, the difference in spectral reflectance will once again be at a minimum.

Figure 8:
FIG. 8 illustrates a periodic pattern that will be formed by the difference in spectral reflectance.

FIG. 8 illustrates a periodic pattern that will be formed by the difference in spectral reflectance from measurement location 106 and 108 as the sensor head 102 is moved relative to the scale 104. A minimum, e.g., zero plus noise, is produced when the periodic patterns 106 and 108 on the sensor head 102 are in the defined aligned relationship with the periodic pattern 105 on scale 104. As the sensor head 102 and scale 104 are moved relative to one another, the difference will increase from the minimum and then will decrease back towards the minimum, thereby creating a series of minima each time the shift e between the periodic patterns becomes zero. By detecting and counting the minima produced and with knowledge of the length of the pitch on the periodic patterns, the position of the sensor head 102 with respect to the scale 104 may be determined.

Figure 9:
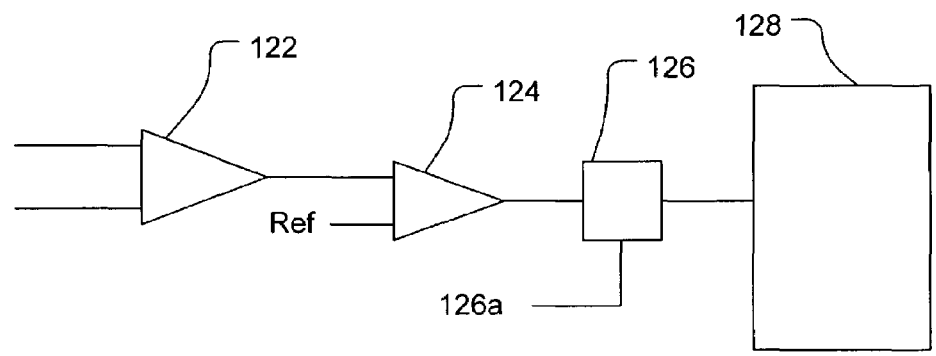
FIG. 9 shows a schematic view of an evaluation circuit used with the present invention.

Referring back to FIG. 3, evaluation circuit 120 includes a comparator circuit 122, a threshold circuit 124 and a counter circuit 126. FIG. 9 shows a schematic view of an evaluation circuit including comparator circuit 122, a threshold circuit 124 and a counter circuit 126. Comparator circuit 122 receives the output signals from detectors 112 and 114 and calculates the difference between the signals. When a plurality of wavelengths are used, the differential spectrum δR may be determined as follows:

$$\delta R = \sum_i (R_i 1 - R_i 2)^2. \qquad \text{eq. 1}$$

where R1 is the measurement from location 106 and R2 is the measurement from location 108, and i is the wavelength number in the spectrum.

Once comparator circuit 122 determines the differential spectrum δR, the threshold circuit 124 will compare the differential spectrum δR with a reference Ref value, which ideally would be zero (or ground), but due to noise that may be present in the system, some non-zero value may be used. When the differential spectrum δR is below the threshold Ref, an appropriate signal is sent to the counter circuit 126. If the differential spectrum δR is above the threshold Ref, no signal is sent to counter circuit 126.

When counter circuit 126 receives a signal from threshold circuit 124 indicating that the differential spectrum δR is less than the threshold Ref, counter circuit 126 will increment a count when the sensor head 102 and scale 104 are moving in one direction and decrement the count when the sensor head 102 and scale 104 are moving in the other direction. Counter circuit 126 may receive a signal on line 126a, e.g., from the control system that controls the relative movement, indicating whether to increment or decrement the count. Based on the count from the counter circuit 126, as well as the pitch of the periodic patterns, a processor 128 in evaluation circuit 120 can calculate the position of sensor head 102 with respect to the scale 104.

It should be understood that evaluation circuit 120 may include hardware or software to perform any or all of the evaluation functions. Thus, for example, evaluation circuit 120 may be a processor that includes a computer-usable medium with computer-readable program code embodied therein for causing the processor to produce the differential spectrum δR, to determine when the differential spectrum is at a minimum, and to increment or decrement a count every time the differential spectrum is at a minimum. Alternatively, some of the functions may be performed by software while others are performed by hardware. One of ordinary skill in the art can program code necessary to determine the position of the sensor head 102 with respect to the scale in accordance with the present invention in view of the present disclosure.

By counting the minima, the resolution of the encoder 100 is approximately the pitch of the periodic patterns. The resolution, however, can be increased to sub-nanometer accuracy by recoding the differential spectrum δR as the sensor head 102 and the scale 104 are moved relative to each other through at least one period, i.e., from one minima to the next minima as a reference. During a measurement, the encoder 100 will provide the rough position as the number of minima, and by comparing the measured differential spectrum δR with the stored library of differential spectrum δR, the position of the sensor head 102 relative to the scale may be interpolated.

In another embodiment, a reference technique, similar to that described in U.S. patent application entitled "Alignment Target with Designed in Offset" by Weidong Yang, et al., having Ser. No. 10/116,863, which is incorporated herein by reference, may be used to increase the resolution of the encoder 100. For example, a reference technique with three measurement locations may be used. Two of the measurements are provided by measurement locations 106 and 108. By moving the sensor head 102 with respect to the scale 104 by a known amount d, a reference offset is produced and may be measured at, e.g., measurement location 106. The additional reference offset d, is preferably 1 to 15 percent of the pitch of the periodic patterns. The measurement of the reference offset d may be made prior to stopping the relative motion of the scale 104 and sensor head 102, or the measurement may be made by moving the one of the sensor head 102 or scale 104, measuring the reference offset d, and moving the sensor head 102 or scale 104 back into position. Once the reference measurement is made, the precise position between the sensor head 102 and the scale 104 may be determined as follows:

$$e = \frac{R1 - R2}{R3 - R1} \cdot \frac{d}{2} \qquad \text{eq. 2}$$

where e is the amount of shift from alignment, R1 is the measurement from location 106 and R2 is the measurement from location 108, R3 is the reference measurement (i.e., location 106 moved by an amount d) and d is the amount of the reference offset. It should be understood that e can be calculated using an optimization process as described in U.S. patent application entitled "Alignment Target with Designed in Offset", which is incorporated herein by reference.

Moreover, if desired, additional reference measurements may be made, as described in U.S. patent application entitled "Alignment Target with Designed in Offset", which is incorporated herein by reference.

It should be understood that if desired only one measurement locations, e.g., location 106 may be used. A first measurement is made and the sensor head 102 and scale 104 are moved by a known amount D. A second measurement at location 106 is then made. In this manner, two measurements are made using only a single measurement location. The two measurements can then be compared to each other to determine the position of the sensor head 102 with respect to the scale 104.

Moreover, it should be understood that the alignment target 101 on the encoder 100 may be used to provide only a fine resolution of the encoder. Thus, there is no need to count the minima. For example, a conventional encoder may be used to produce a course position, while the encoder 100 with alignment target 101 may be used to produce the fine position as described above.

Figure 10:
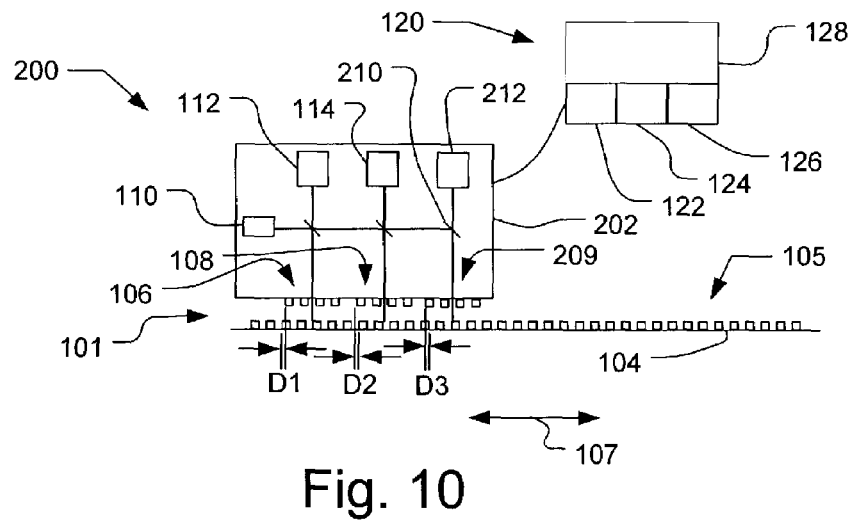
FIG. 10 shows another embodiment of an encoder in accordance with the present invention.

If desired, the encoder may include a sensor head with additional measurement locations. FIG. 10 shows an encoder 200 that is similar to the encoder 100 shown in FIG. 3, like designated elements being the same, except that three measurement locations 106, 108 and 209 are used in sensor head 202. If desired, more than three measurement locations may be used. As shown in FIG. 10, sensor head 202 has an additional beam splitter 210 and detector 212 used in conjunction with the additional measurement location 209. As illustrated in FIG. 10, the measurement locations 106, 108 and 209 have three different offsets D1, D2 and D3 between the periodic patterns on the sensor head 202 and the periodic pattern 105 on the scale 104.

Figure 11A:
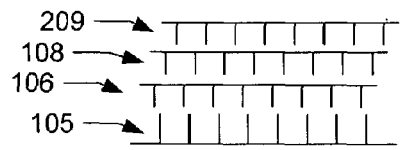
FIGS. 11A, 11B, and 11C illustrate schematically the operation of the encoder of FIG. 10.
Figure 11B:
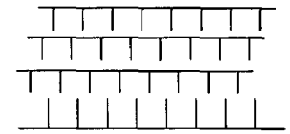
Figure 11C:
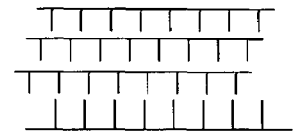

FIGS. 11A, 11B, and 11C illustrate schematically the operation of encoder 200. Periodic patterns 106, 108, and 209 are shown overlapping for the sake of reference. As shown in FIG. 11A, when periodic patterns 106 and 108 are offset from periodic pattern 105 by the same amount, the difference in the spectra produced by measurement locations 106 and 108, i.e., the differential spectra $\delta R_{106\text{-}108}$ will be a minimum. As the sensor head 202 moves relative to the scale 104, the differential spectra $\delta R_{106\text{-}108}$ will vary periodically, as illustrated in FIG. 12.

Similarly, as shown in FIG. 11B, when periodic patterns 108 and 209 are offset from periodic pattern 105 by the same amount, the differential spectra $\delta R_{108\text{-}209}$ produced by measurement locations 108 and 209 will be at a minimum. Again, the differential spectra $\delta R_{108\text{-}209}$ will vary periodically, as shown in FIG. 12, as the sensor head 202 and the scale 104, move relative to each other. Similarly, as shown in FIG. 11C, when periodic patterns 106 and 209 are offset from periodic pattern 105 by the same amount, the differential spectra $\delta_{106\text{-}209}$ produced by measurement locations 106 and 209 will be at a minimum, and the differential spectra $\delta R_{106\text{-}209}$ will vary, as illustrated in FIG. 12, as the position of the sensor head 202 relative to the scale 104 varies.

Figure 12:
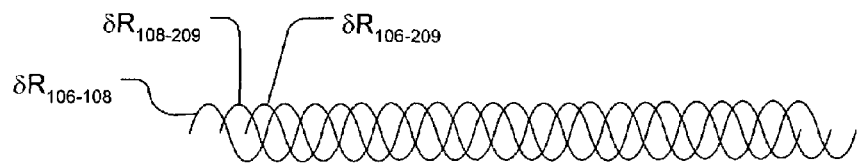
FIG. 12 illustrates periodic patterns that will be formed by the difference in spectral reflectance in the encoder of FIG. 10.

Thus, as can be seen in FIG. 12, by using three measurement locations, the number of minima is increased, which increases the resolution of the encoder 200. In addition, the use of more than two measurement locations is desirable, because the differential spectra δR from two locations does not vary linearly over the entire period, i.e., from one minima to the next minima. The differential spectra δR is highly linear in a range of approximately ±25 percent from the defined alignment point. Thus, by using at least three measurement locations, two of the measurement locations are always within the linear range.

In addition, with the use three or more measurement locations, a reference measurement may be made as discussed above in reference to equation 2.

Figure 13:
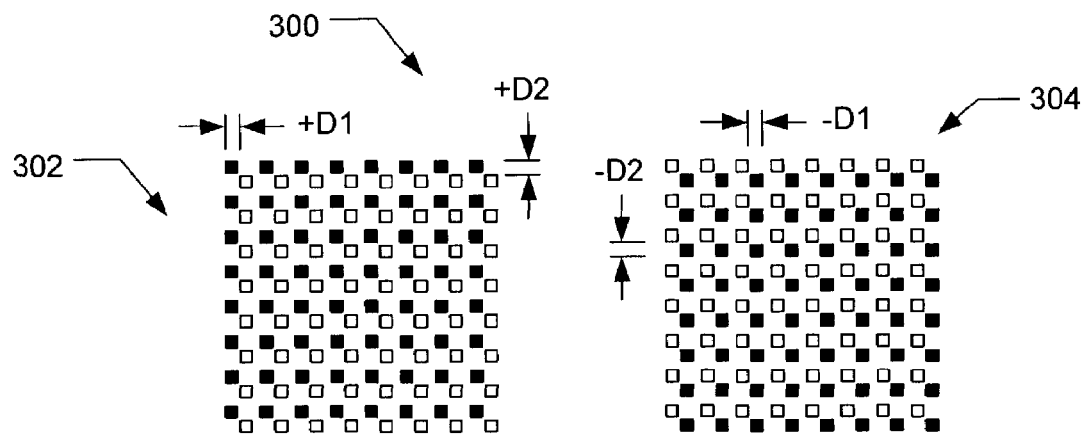
FIG. 13 shows a top view of an alignment target that may be used with the encoder.

If desired, the alignment target 101 used with the encoder may have periodicities in two directions. FIG. 13 shows a top view of an alignment target 300, which may be used in an encoder, in accordance with the present invention. As shown in FIG. 13, alignment target 300 includes two measurement locations 302 and 304 that are composed of a series of squares that extend in two directions. The solid squares in FIG. 13 are, e.g., the periodic pattern on the scale 104, while the empty squares are the periodic patterns on the sensor head 102. Similar to alignment target 101, alignment target 300 includes an offset of ±D1 in the X direction when the periodic patterns are defined as aligned in the X direction, and an offset of ±D2 in the Y direction when the periodic patterns are defined as aligned in the Y direction. The magnitude of offsets D1 and D2 may be the same or different. If desired, the alignment target 300 may be formed using other shapes besides squares, e.g., circles or polygons, as long as it has periods in two directions. In operation, a sensor head may use two incident beams, e.g., non-normal beams, for each measurement location 302 and 304, e.g., on in the X direction and one in the Y direction.

It should be understood that if desired, either the periodic patterns on the scale 104 or the periodic patterns on the sensor head 102 may have periodicities in two directions.

In accordance with another embodiment of the present invention, sensor head 102 uses only one measurement location, e.g., location 106, and takes two measurements at location 106 with different polarization states, as discussed in more detail in U.S. patent application entitled "Measuring An Alignment Target With Multiple Polarization States" by Weidong Yang, Roger R. Lowe-Webb, which is incorporated herein by reference.

Figure 14A:
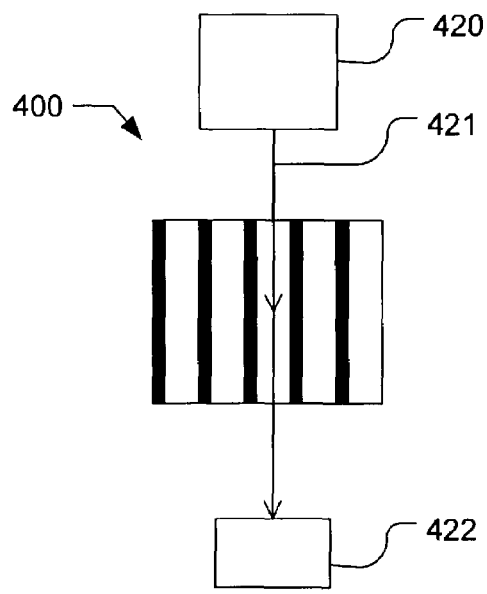
FIGS. 14A and 14B and 15 show a top view and side views, respectively, of an alignment target with which multiple polarization states are used.
Figure 14B:
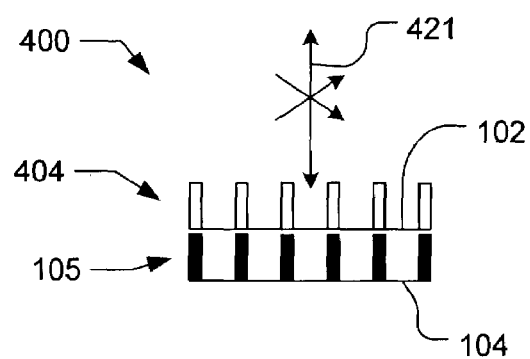

FIGS. 14A and 14B show a top view and side view, respectively, of an alignment target 400 with which multiple polarization states are used. A light source 420 produces a light beam 421 that is incident on the periodic patterns 404 on the sensor head 102 and periodic pattern 105 on scale 104. Light source 420 produces light that has a non-normal angle of incidence and has an azimuthal angle that is non-parallel with the direction of periodicity of the periodic patterns in alignment target 400, if the pattern has only one periodicity direction. With alignment target 400, the periodic patterns 404 and 105 are defined as aligned when there is no offset between the two.

The light source 420 produces a light beam 421 that has a single polarization state. After the light interacts with alignment target 400, a detector 422 detects the resulting polarization states. Alternatively, light source 420 may produce two light beams, each with a different polarization state. The detector 422 can detect the resulting polarization states or if desired detect the same polarization state for the two different light beams.

Figure 15:
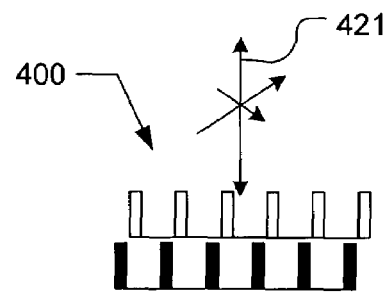

The difference in intensity of the polarization states from alignment target 400 varies proportionally with the alignment error. When the periodic patterns 404 and 105 are in the defined aligned relationship, the polarization states in the detected radiation will have equal intensity. Thus, the difference between the detected polarization states will be a minimum. However, when there is a shift between periodic patterns 404 and 105, as illustrated in FIG. 15, the intensity of the detected polarization states will be unequal. Thus, difference in the polarization states will increase to a maximum at which time it will decrease back to the minimum, i.e., when the periodic patterns 404 and 105 are back in the defined aligned relationship.

Thus, with alignment target 400, the minima in the difference between the detected polarization states may be counted to determine the position of the sensor head with respect to the scale. Moreover, as describe above, the accuracy of the encoder may be further increased by using a reference measurement or using a library of the differences in polarization states with respect to a period, i.e., from minimum to minimum, to interpolate the position.

For more discussion on the use of multiple polarization states and its possible uses with an encoder, the reader is referred to U.S. patent application entitled "Measuring An Alignment Target With Multiple Polarization States" by Weidong Yang, Roger R. Lowe-Webb, which is incorporated herein by reference.

Figure 16:
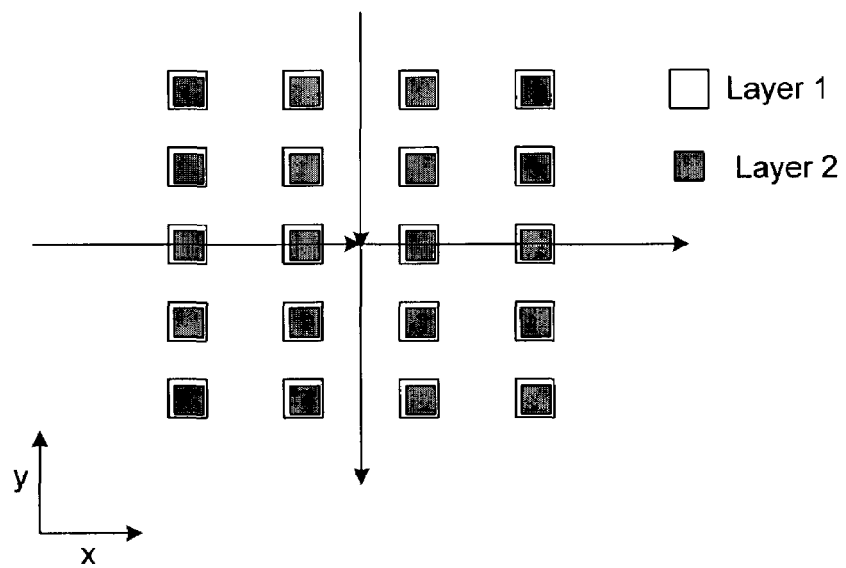
FIG. 16 shows a top view of an alignment target that may be used with the encoder.

With the use of multiple polarization states, an alignment target having only one location with a periodic pattern with periodicities in two directions may be used to measure the position of the sensor head with respect to the scale in both the X and Y direction, as illustrated in FIG. 16.

Figure 17:
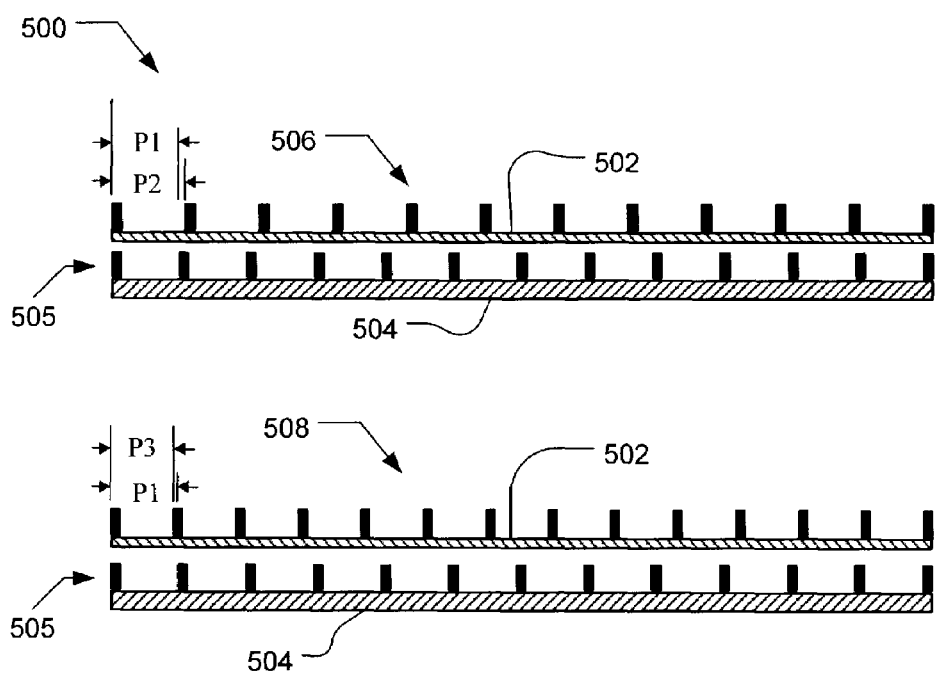
FIG. 17 shows an embodiment of an alignment target that may be used with the encoder.

In another embodiment, moiré fringe patterns may be used in an encoder. FIG. 17 shows an embodiment of the alignment target 500 that may be used with, e.g., encoder 100 in FIG. 3. Alignment target 500 includes two measurement locations, which includes periodic patterns 506 and 508 on the sensor head 502 and the periodic pattern 505 on scale 504. The periodic pattern 505 on scale 504 has a P1, while the periodic pattern 506 has a pitch P2, which is larger than pitch P1 by an amount δ, and the periodic pattern 508 has a pitch P3 that is smaller than the pitch P1 by an amount δ.

Figures 18A, 18B:
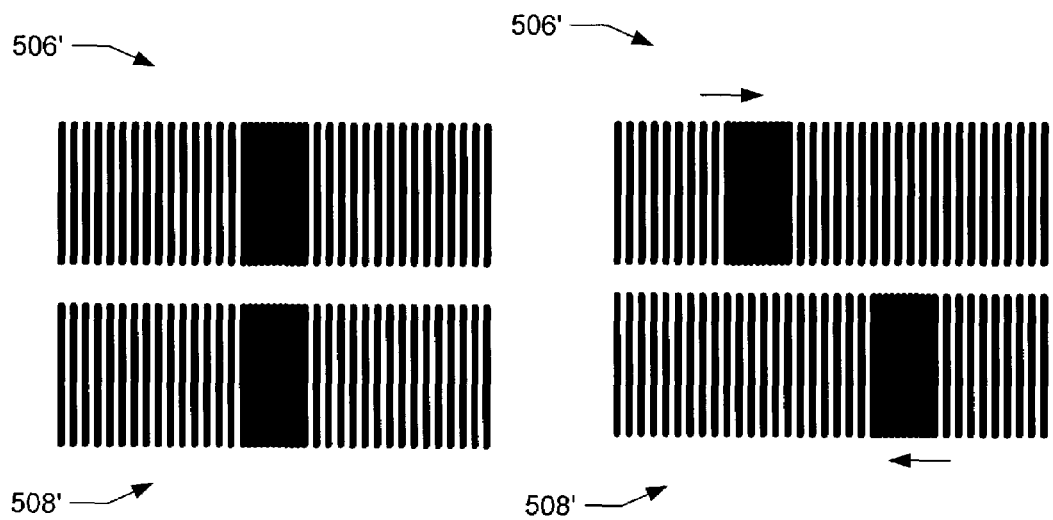
FIGS. 18A and 18B shows moiré fringe patterns produced by the alignment target shown in FIG. 17.

When imaged, measurement locations 506 and 508 will produce moiré fringe patterns, similar to that shown in FIG. 18A, wherein pattern 506' is produced by location 506 and pattern 508' is produced by location 508. As the sensor head 502 and the scale 504 are moved relative to each other, the bands in the moiré fringe patterns 506' and 508' will move in opposite directions, as indicated by the arrows in FIG. 18B. By detecting when the bands in the moiré fringe patterns 506' and 508' coincide, it is possible to determine when the periodic patterns 506 and 508 are in a defined aligned relationship with periodic pattern 505. Thus, by counting every time the bands in the moiré fringe patterns 506' and 508' coincide, the relative position of the sensor head 502 and scale 504 can be determined. Moreover, as discussed above, by using referencing techniques, e.g., by recording a series of positions of the bands over one period, i.e., from the defined aligned relationship to the next defined aligned relationship, the position of the sensor head 502 with respect to the scale 504 may be interpolated.

For more discussion on the use of moiré fringe patterns their possible uses with an encoder, the reader is referred to U.S. patent application entitled "Alignment Target with Designed in Offset" by Weidong Yang, Roger R. Lowe-Webb, John D. Heaton, and Guoguang Li; and U.S. patent application Entitled "Positioning Two Elements Using An Alignment Target with a Designed in Offset" by Weidong Yang, Roger R. Lowe-Webb, both of which are incorporated herein by reference.

Figure 19:
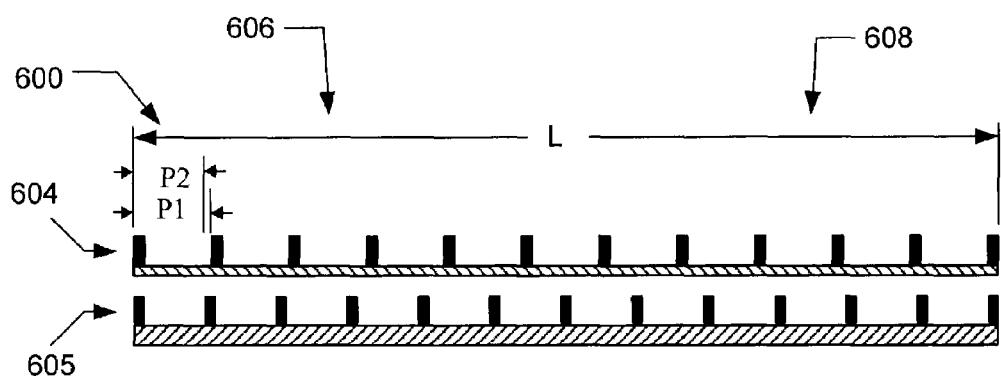
FIG. 19 shows an embodiment of an alignment target that may be used with the encoder.

Moreover, it should be understood that alignment target 101 may be composed of a single periodic pattern on the sensor head and a periodic pattern on the scale as shown in FIG. 19. Alignment target 600 in FIG. 19, includes a periodic pattern 604 on the sensor head that has a pitch P1 and a periodic pattern 605 on the scale that has a pitch P2, which is different than pitch P1. When alignment target 600 has a linear dimension L, such that all phases between 0 and 360 degrees is included, there will be two locations, shown generally as 606 and 608 that are equal and opposite offsets between the periodic patterns 604 and 605.

Although the invention has been described with reference to particular embodiments, the description is only an example of the invention's application and should not be taken as a limitation. Various other adaptations and combinations of features of the embodiments disclosed are within the scope of the invention as defined by the following claims.

What is claimed is:

1. A method of determining the position of a first element with respect to a second element, said method comprising:
providing an alignment target on said first element and said second element, the alignment target having at least one periodic pattern on said first element and at least one periodic pattern on said second element, the at least one periodic pattern on said first element overlying the at least one periodic pattern on the second element, the at least one periodic pattern on said first element and the at least one periodic pattern on said second element having the same pitch, said alignment target, when aligned, has a first location with the periodic pattern on the first element offset from the periodic pattern on the second element by a first amount and having a second location with the periodic pattern on the first element offset from the periodic pattern on the second element by a second amount;
moving at least one of said first element and said second element with respect to the other;
illuminating said first and second locations on said alignment target with incident radiation;
detecting the radiation from said first and second locations of said alignment target after interacting with said periodic pattern on said first element and said periodic pattern on said second element; and
using said detected radiation to determine the position of said first element with respect to said second element by comparing the detected radiation from said first and second locations to determine when the alignment target is aligned.

2. The method of claim 1, further comprising:
counting the times said alignment target is in alignment to determine the position of said first element with respect to said second element.

3. The method of claim 1, wherein said comparing the detected radiation includes calculating the difference between the detected radiation from a first location and the detected radiation from a second location.

4. The method of claim 1, wherein said first element is a sensor head and said second element is a scale.

5. The method of claim 1, wherein said periodic patterns are diffraction gratings.

6. The method of claim 1, wherein at least one of said periodic patterns has a periodicity in two directions.

7. The method of claim 1, wherein detecting radiation comprises determining the spectra from said first and second locations of said alignment target and wherein said comparing the detected radiation comprises calculating the difference between said spectra.

8. The method of claim 7, further comprising:
comparing the difference between said spectra to a threshold; and
incrementing a count when said difference is below a threshold when motion between said first element and said second element is in said first direction and decrementing said count when said difference is below a threshold when the motion between said first element and said second element is in said second direction.

9. The method of claim 1, wherein said first and second locations are illuminated with radiation at the same time.

10. The method of claim 1, further comprising:
detecting when the comparison of the detected radiation is at an approximate minimum; and
counting the minima produced by said comparison while one of said first element and second element are moved relative to the other.

11. The method of claim 1, wherein said first amount and said second amount are equal in magnitude but opposite in direction.

12. The method of claim 1, wherein said alignment target includes a third location with the periodic pattern on the first element offset from the periodic pattern on the second element by a third amount.

13. The method of claim 12, further comprising:
illuminating said first, second and third locations on said alignment target with incident radiation;
detecting the radiation from said first, second and third locations after interacting with said alignment target;
comparing the detected radiation from said first and second locations;
comparing the detected radiation from said second and third locations;
comparing the detected radiation from said first and third locations;
detecting when the comparison of the detected radiation is at an approximate minimum; and
counting the minima produced by said comparison while one of said first element and second element are moved relative to the other.

14. The method of claim 1, wherein said first and second locations are two separate periodic patterns on said first element.

15. The method of claim 1, further comprising:
recording the comparison of the detected radiation for a plurality of positions between said first element and said second element as said first element and said second element are moved with respect to each other; and
comparing a comparison of the detected radiation with the recorded comparisons to determine the position of said first element with respect to said second element.

16. The method of claim 1, further comprising:
moving at least one of said first element and said second element with respect to other by a reference amount and illuminating at least said first location and detecting the radiation from said first location to generate a reference measurement; and
using said reference measurement along with the comparison of the detected radiation to determine the position of said first element with respect to said second element.

17. A method of determining the position of a first element with respect to a second element, said method comprising:
providing an alignment target on said first element and said second element, the alignment target having at least one periodic pattern on said first element and at least one periodic pattern on said second element;
moving at least one of said first element and said second element with respect to the other;
illuminating said alignment target with at least one light beam having at least one polarization state;
detecting the radiation from said alignment target after interacting with said periodic pattern on said first element and said periodic pattern on said second element, wherein detecting the radiation from said alignment target comprises detecting the intensities at least at two polarization states of the light from said alignment target; and
using said detected radiation to determine the position of said first element with respect to said second element, wherein using said detected radiation comprises comparing said intensities of said two polarization states to determine the position of said first element with respect to said second element.

18. The method of claim 17, wherein said alignment target is illuminated with two beams, each having a different polarization state.

19. The method of claim 17, wherein:
said illuminating said alignment target comprises illuminating said alignment target with two light beams having at least one polarization state,
detecting the radiation from said alignment target comprises detecting the intensity at least at one polarization state of the two light beams from said alignment target; and
using said detected radiation comprises comparing the intensity of said at least one polarization state of the two light beams to determine the position of said first element with respect to said second element.

20. A method of determining the position of a first element with respect to a second element, said method comprising:
providing an alignment target on said first element and said second element, the alignment target having at least one periodic pattern on said first element and at least one periodic pattern on said second element;
moving at least one of said first element and said second element with respect to the other;
illuminating said alignment target with incident radiation;
detecting the radiation from said alignment target after interacting with said periodic pattern on said first element and said periodic pattern on said second element;
illuminating said alignment target a second time after said first element and said second element are moved by a known distance to a new position;
detecting the radiation from said alignment target from the second illumination; and
using the detected radiation from the new position and the detected radiation from the previous detection to determine the position of said first element with respect to said second element.

21. A method of determining the position of a first element with respect to a second element, said method comprising:
providing an alignment target on said first element and said second element, the alignment target having at least one periodic pattern on said first element and at least one periodic pattern on said second element, said alignment target has a first location with the periodic pattern on the first element offset from the periodic pattern on the second element by a first amount and having a second location with the periodic pattern on the first element offset from the periodic pattern on the second element by a second amount;
moving at least one of said first element and said second element with respect to other;
illuminating said first and second locations on said alignment target with incident radiation;
detecting the radiation from said first and second locations after interacting with said alignment target;
comparing the detected radiation from said first and second locations;
detecting when the comparison of the detected radiation is at an approximate minimum; and
counting the minima produced by said comparison to determine the position of said first element with respect to said second element.

22. The method of claim 21, wherein said first and second locations are two separate periodic patterns on said first element.

23. The method of claim 21, further comprising:
recording the comparison of the detected radiation for a plurality of positions between said first element and said second element as said first element and said second element are moved with respect to each other; and
comparing a comparison of the detected radiation with the recorded comparisons to determine the position of said first element with respect to said second element.

24. The method of claim 21, further comprising:
moving at least one of said first element and said second element with respect to other by a reference amount and illuminating at least said first location and detecting the radiation from said first location to generate a reference measurement; and
using said reference measurement along with the comparison of the detected radiation to determine the position of said first element with respect to said second element.

25. The method of claim 21, wherein said alignment target includes a third location with the periodic pattern on the first element offset from the periodic pattern on the second element by a third amount, said method further comprising:
illuminating said third location on said alignment target with incident radiation;
detecting the radiation from said third location after interacting with said alignment target;
comparing the detected radiation from said second and third locations;
comparing the detected radiation from said first and third locations;
detecting when the comparison of the detected radiation is at an approximate minimum; and
counting the minima produced by said comparison while one of said first element and second element are moved relative to the other.

26. The method of claim 21, wherein said comparing the detected radiation includes calculating the difference between the detected radiation from a first location and the detected radiation from a second location.

27. The method of claim 21, wherein said first element is a sensor head and said second element is a scale.

28. The method of claim 21, wherein said periodic patterns are diffraction gratings.

29. The method of claim 21, wherein detecting radiation comprises determining the spectra from said first and second locations of said alignment target and wherein said comparing the detected radiation comprises calculating the difference between said spectra.

30. The method of claim 29, further comprising:
comparing the difference between said spectra to a threshold; and
incrementing a count when said difference is below a threshold when motion between said first element and said second element is in said first direction and decrementing said count when said difference is below a threshold when the motion between said first element and said second element is in said second direction.

31. A method of determining the position of a first element with respect to a second element, said method comprising:
providing an alignment target on said first element and said second element, the alignment target has a first periodic pattern on said first element and a second periodic pattern on said second element;
moving at least one of said first element and said second element with respect to other;
illuminating said first periodic pattern and said second periodic pattern of said alignment target with light having at least two polarization states;
detecting the intensities of the polarization states of said light after interacting with said alignment target; and
comparing said intensities of said polarization states;
detecting when the comparison of the intensities is at an approximate minimum; and
counting the minima produced by said comparison to determine the position of said first element with respect to said second element.

32. The method of claim 31, wherein said light is non-normally incident on said alignment target.

33. The method of claim 31, further comprising:
recording the comparison of the intensities for a plurality of positions between said first element and said second element as said first element and said second element are moved with respect to each other; and
comparing a comparison of the intensities with the recorded comparisons to determine the position of said first element with respect to said second element.

34. The method of claim 31, wherein said first element is a sensor head and said second element is a scale.

35. The method of claim 31, wherein said periodic patterns are diffraction gratings.

36. An apparatus for determining the position of a first element with respect to a second element, said apparatus comprising:
an alignment target on said first element and said second element, the alignment target having at least one periodic pattern on said first element and at least one periodic pattern on said second element, said alignment target has a first location with the periodic pattern on the first element offset from the periodic pattern on the second element by a first amount and having a second location with the periodic pattern on the first element offset from the periodic pattern on the second element by a second amount;
at least one light source for producing light to be incident on said first location and said second location of said alignment target;
a first light detector for detecting light that interacts with said first location;
a second light detector for detecting light that interacts with said second location;
a comparator to calculate the difference between the detected light from said first and second locations, wherein said comparator produces an output signal that has a minimum when said periodic pattern on said first element and said periodic pattern on said second element are aligned; and
a counter for counting the number of minima produced by said comparator to determine the position of said first element with respect to said second element.

37. The apparatus of claim 36, further comprising:
a threshold circuit for determining when the output signal from said comparator is below a threshold, said threshold producing an output signal to said counter indicating when to increment the number of minima.

38. The apparatus of claim 36, comprising a processor coupled to the first and second light detectors, said processor having a computer-usable medium having computer-readable program code embodied therein for causing said processor to calculate the difference between the detected light from said first and second locations, and to count the number of minima.

39. The apparatus of claim 36, wherein said periodic patterns are diffraction gratings.

40. The apparatus of claim 36, wherein said periodic patterns on said first element and said periodic patterns on said second element have different pitches.

41. The apparatus of claim 36, wherein said alignment target has a first periodic pattern on said first element at said first location and a second periodic pattern on said first element at said second location.

42. An apparatus for determining the position of a first element with respect to a second element, said apparatus comprising:
an alignment target on said first element and said second element, the alignment target has a first periodic pattern on said first element and a second periodic pattern on said second element;
at least one light source for producing light to be incident on said alignment target, said light have a plurality of polarization states;
a light detector for detecting the intensities of the polarization states after the light interacts with said alignment target;
a comparator to calculate the difference between the intensities of said polarization states; and
a counter for counting the number of minima produced by said comparator to determine the position of said first element with respect to said second element.

43. The apparatus of claim 42, further comprising:
a threshold circuit for determining when the output signal from said comparator is below a threshold, said threshold producing an output signal to said counter indicating when to increment the number of minima.

44. The apparatus of claim 42, comprising a processor coupled to said light detector, said processor having a computer-usable medium having computer-readable program code embodied therein for causing said processor to calculate the difference between the detected light from said first and second locations, and to count the number of minima.

45. The apparatus of claim 42, wherein said periodic patterns are diffraction gratings.

* * * * *